US012086107B2

(12) United States Patent
Mu et al.

(10) Patent No.: US 12,086,107 B2
(45) Date of Patent: Sep. 10, 2024

(54) FILE SHARING METHOD, APPARATUS, AND SYSTEM

(71) Applicant: DIGITAL CURRENCY INSTITUTE, THE PEOPLE'S BANK OF CHINA, Beijing (CN)

(72) Inventors: Changchun Mu, Beijing (CN); Gang Di, Beijing (CN); Youcai Qian, Beijing (CN); Sude Qing, Beijing (CN); Qingjie Chen, Beijing (CN); Jinzhao Du, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 0 days.

(21) Appl. No.: 18/040,619

(22) PCT Filed: Aug. 4, 2021

(86) PCT No.: PCT/CN2021/110594
  § 371 (c)(1),
  (2) Date: Feb. 3, 2023

(87) PCT Pub. No.: WO2022/028484
  PCT Pub. Date: Feb. 10, 2022

(65) Prior Publication Data
  US 2023/0315692 A1 Oct. 5, 2023

(30) Foreign Application Priority Data
  Aug. 4, 2020 (CN) .......................... 202010772463.5

(51) Int. Cl.
  *G06F 16/176* (2019.01)
  *G06F 16/174* (2019.01)
  *G06F 21/60* (2013.01)

(52) U.S. Cl.
  CPC ...... *G06F 16/1767* (2019.01); *G06F 16/1744* (2019.01); *G06F 21/602* (2013.01)

(58) Field of Classification Search
  CPC ........ G06F 21/64; G06F 16/27; G06F 21/602; G06F 3/065; G06F 3/067; G06F 16/2255; G06F 16/9014
  (Continued)

(56) References Cited

U.S. PATENT DOCUMENTS

| 10,666,767 | B1 | 5/2020 | Floyd et al. |
| 2017/0300713 | A1 | 10/2017 | Fan et al. |

(Continued)

FOREIGN PATENT DOCUMENTS

| CN | 107682016 A | 2/2018 |
| CN | 107728941 A | 2/2018 |

(Continued)

OTHER PUBLICATIONS

International Search Report and Written received in International PCT Application No. PCT/CN2021/110594, mailed Oct. 26, 2021, 10 pages.

(Continued)

*Primary Examiner* — Hung T Vy
(74) *Attorney, Agent, or Firm* — Stoel Rives LLP

(57) ABSTRACT

A file sharing method, apparatus, and system, mainly relate to the technical field of computers. The method comprises: obtaining a file to be shared; concurrently transmitting the shared file compression packages onto a blockchain; forming data blocks according to a compressed package file name and a hash value thereof, wherein the data blocks comprise the hash value of a previous data block; using the hash value of a last data block as a root hash value; and according to the root hash value, obtaining a file comprised in the last data block, and then obtaining each file compression package in (Continued)

a blockchain indicated by the root hash value. By compressing a plurality of files into file packages, the present application partially overcomes the technical problem that the burden of a network resource is too high due to a large number of files; the file on-chain and sharing efficiency is improved by performing concurrent on-chain on each file compression package; and a one-way linked list data structure on the blockchain is used to save and share the file, thereby improving the security of the file.

19 Claims, 7 Drawing Sheets

(58) Field of Classification Search
    USPC .......................................................... 707/827
    See application file for complete search history.

(56) References Cited

U.S. PATENT DOCUMENTS

| | | | | |
|---|---|---|---|---|
| 2018/0343128 | A1* | 11/2018 | Uhr | .................. H04L 9/3236 |
| 2019/0266178 | A1 | 8/2019 | Madhavan et al. | |
| 2020/0084022 | A1 | 3/2020 | Winarski | |
| 2020/0210411 | A1* | 7/2020 | Yang | ...................... H03M 7/30 |
| 2020/0235943 | A1 | 7/2020 | Salimi et al. | |
| 2021/0117381 | A1* | 4/2021 | Irazabal | .............. G06F 16/1834 |

FOREIGN PATENT DOCUMENTS

| | | |
|---|---|---|
| CN | 110032545 A | 7/2019 |
| CN | 110032581 A | 7/2019 |
| CN | 110224814 A | 9/2019 |
| CN | 110349019 A | 10/2019 |
| CN | 111984615 A | 11/2020 |

OTHER PUBLICATIONS

European Patent Office, Extended European Search Report for European Patent Application No. 21854512.7, mailed Jun. 24, 2024, 8 pages.

* cited by examiner

FILE SHARING METHOD, APPARATUS, AND SYSTEM

This application is a national stage under 35 U.S.C. § 371 of International Application No. PCT/CN2021/110594, filed Aug. 4, 2021, which claims the priority of the Chinese patent application No. 202010772463.5 entitled "Method, Apparatus and System for File Sharing" filed on Aug. 4, 2020, and the content disclosed in the above Chinese patent application is hereby cited in its entirety as part of the application.

TECHNICAL FIELD

The present disclosure relates to the technical field of computer technology, a file sharing method, apparatus and system.

BACKGROUND ART

In the business process of enterprises, it is often necessary to share files required by the business, especially when it involves business between enterprises. With the development of the blockchain technology, enterprises can share files based on the blockchain. The main methods are 1. put all shared files on chain as transactions and broadcast to realize sharing; 2. save files in a centralized database, put the electronic storage certificates of the files on chain and broadcast to realize sharing.

In the process of realizing the present disclosure, the inventor has found that at least the following problems in the prior art:

In method 1, when the number of files is large, the usage rate of network resources is too high, leading to a decrease in the on-chain efficiency of files; in method 2, in saving files in a centralized database, when the files are of high security, there are certain security risks during using the files.

SUMMARY

In view of this, the embodiments of the present disclosure provide a file sharing method and apparatus, comprising: obtaining files to be shared, concurrently transmitting the shared file compression packages onto a blockchain, forming a data block according to file names and hash values of the file compression packages, wherein the data blocks comprise the hash value of a previous data block; using the hash value of a last data block as a root hash value; obtaining a file comprised in the last data block according to the root hash value, and then obtaining each file compression package in a blockchain indicated by the root hash value. By compressing a plurality of files into file packages, the present application partially overcomes the technical problem too high burden of a network resource due to a large number of files; by performing concurrent on-chain on each file compression package, the file on-chain and sharing efficiency is improved; and by saving and sharing the files using the one-way linked list data structure on the blockchain, the security of files is improved.

To achieve the above purpose, in accordance with the first aspect of the embodiments of the present disclosure, a file sharing method is provided, comprising: obtaining files to be shared and forming at least two file compression packages; transmitting the file compression packages onto a blockchain, and obtaining hash values corresponding to the file compression packages; generating a first data block for a file name and a hash value of a first file compression package in the at least two file compression packages, and transmitting the first data block onto a blockchain; generating second data blocks for a second file compression package in the at least two file compression packages excluding the first file compression package according to a hash value of a previous data block, a file name and a corresponding hash value of the second file compression package, and transmitting the second data blocks onto a blockchain, and using a hash value of a last second data block in the second data blocks as a root hash value, and transmitting the root hash value.

To achieve the above object, in accordance with the second aspect of the embodiments of the present disclosure, a file sharing method is provided, comprising: receiving a root hash value, obtaining a last data block corresponding to the root hash value from the blockchain according to the root hash value, obtaining a file name of a file compression package comprised in the last data block, and obtaining the files in the file compression package; cyclically executing the following steps until each file compression package in the blockchain indicated by the root hash value is obtained: using a hash value of a previous data block comprised in the last data block as a current hash value, obtaining a hash value of the previous data block, the file name of the file compression package corresponding to a current data block, and the files in the file compression package from the blockchain according to the current hash value; and using the hash value of the previous data block as the current hash value.

To achieve the above object, in accordance with the fifth aspect of the embodiments of the present disclosure, file sharing system 900 is provided, comprising file sharing apparatus 700 provided in accordance with the aforesaid third aspect, and file sharing apparatus 800 provided in accordance with the aforesaid fourth aspect.

To achieve the above object, in accordance with the sixth aspect of the embodiments of the present disclosure, an electronic apparatus is provided, comprising: one or more processors; storage means for storing one or more programs when executed by the one or more processors to cause the one or more processors to implement any one of the aforesaid file sharing methods.

To achieve the above object, in accordance with the seventh aspect of the embodiments of the present disclosure, a computer-readable medium is provided, on which a computer program is stored, when the program is executed by a processor, any one of the aforesaid file sharing methods is implemented.

An embodiment of the aforesaid disclosure has the following advantages or beneficial effects: obtaining files to be shared, executing the blockchain concurrent on-chain operation on shared file compression packages, and forming data blocks according to file names and hash values of compression packages, the data blocks containing a hash values of a previous data block; using the hash value of a last data block as a root hash value; according to the root hash value, obtaining the files comprised in the last data block, thereby obtaining each file compression package in the blockchain indicated by the root hash value. By compressing a plurality of files into file packages, the present application partially overcomes the technical problem too high burden of a network resource due to a large number of files; by putting each file compression package concurrently on chain, the file on-chain and sharing efficiency is improved; and by saving and sharing the files using the one-way linked list data structure on the blockchain, the security of files is improved.

The further effects of the above-mentioned nonconventional alternatives will be described below in conjunction with specific embodiments.

BRIEF DESCRIPTION OF DRAWINGS

The accompanying drawings are for better understanding of the present disclosure, and do not constitute an improper limitation of the present disclosure.

DETAILED DESCRIPTIONS OF EMBODIMENTS

Exemplary embodiments of the present disclosure are described below in conjunction with the accompanying drawings, which include various details of the embodiments of the present disclosure to facilitate understanding, and they should be regarded as exemplary only. Accordingly, those ordinary skilled in the art will recognize that various changes and modifications of the embodiments described herein can be made without departing from the scope and spirit of the disclosure. Also, descriptions of well-known functions and constructions are omitted in the following description for clarity and conciseness.

Figure 1:
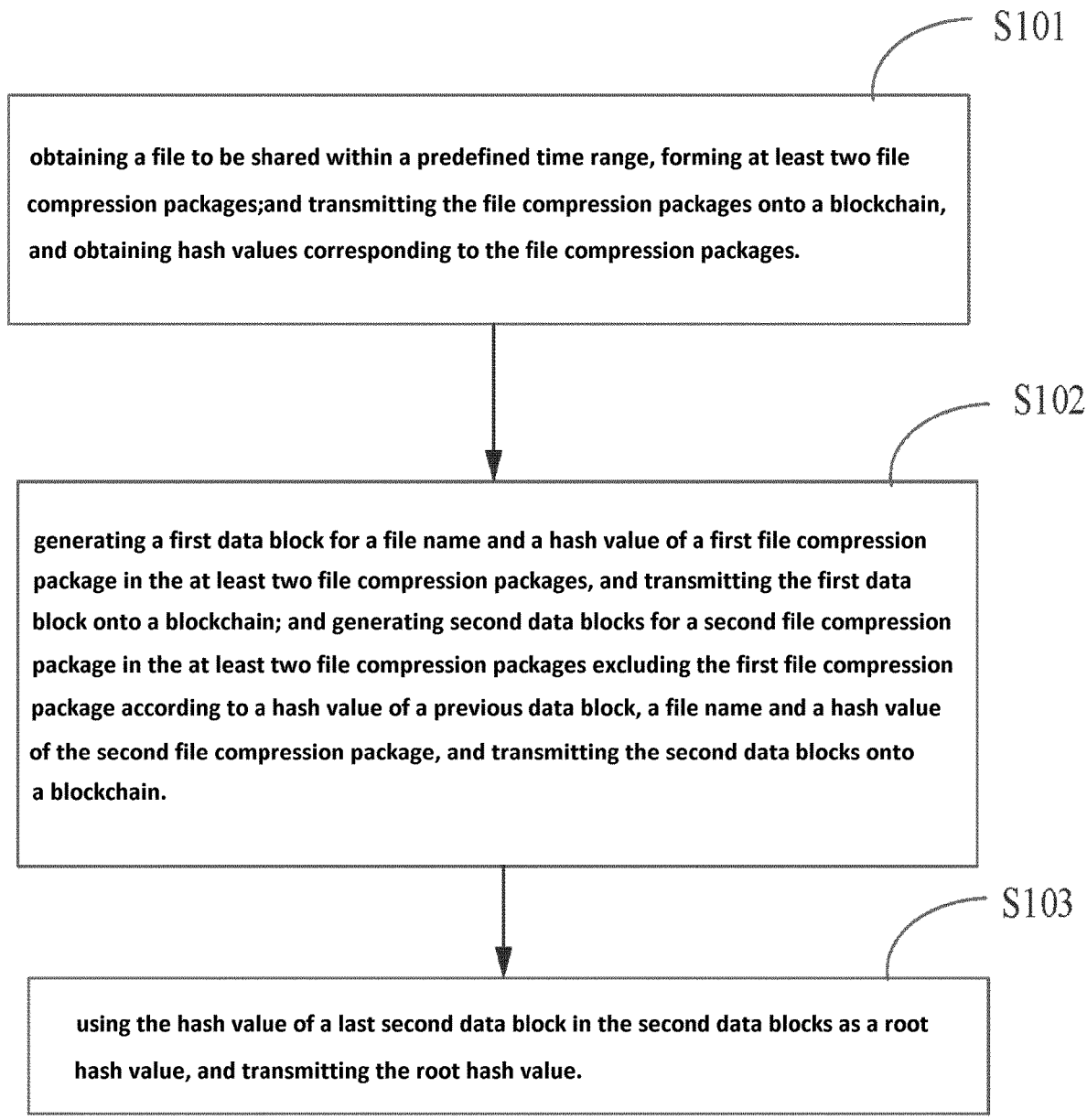
FIG. 1 is a schematic flowchart of a method for storing shared files provided by an embodiment of the present disclosure.

As shown in FIG. 1, the embodiment of the present disclosure provides a file sharing method, and the method may comprise the following steps:

Step S101: obtaining files to be shared and forming at least two file compression packages; transmitting the file compression packages onto a blockchain, and obtaining hash values corresponding to the file compression packages.

Specifically, the files to be shared are files generated in real time, and at least two file packages (that is, multiple file packages) are formed according to the multiple files, and file compression packages are formed respectively. The obtaining files to be shared and forming at least two file compression packages comprises: obtaining files to be shared within a predefined time range, forming at least two file compression packages, and determining a number of files in the file packages according to a network bandwidth.

The files to be shared may be generated within a predefined time range, for example, transaction files generated by an electronic bank within one hour, statement files generated by two electronic banks within half an hour, order files and the like generated by the electronic mall within one day. The predefined time range can be set according to the business scenario and the number of generated files, for example, one day, one hour, 10 minutes, etc. The predefined time range is not limited in the present disclosure. Further, the number of files in each file package is determined according to the total number of the files to be shared obtained and the network bandwidth. It can be understood that, in order to achieve the concurrent on-chain operation according to the network bandwidth, the files in the file package are determined according to the network bandwidth to form multiple file packages, and the file packages are compressed respectively to form file compression packages. Due the different sizes of the files, the number of file packages is variable; for statement files between different electronic banks for example, according to the total amount of files in a time range, the number of files comprised in each file package is determined by obtaining the bandwidth of the network, and further, the file packages are compressed to form multiple file compression packages.

Furthermore, the obtaining files to be shared and forming at least two file compression packages further comprises executing compression and encryption operations on the file packages. It can be understood that the security of the files is improved through encryption, especially the security of files with high security requirements, such as statements between electronic banks. The compression method can use compression tool software, such as gzip, WinRAR, etc. The encryption method can be made with compression software for encryption, or alternatively with the operating system or encryption software for encryption. The specific methods of compression and encryption are not limited in the present disclosure. That is, compression and encryption operations are respectively executed on the file packages to form the file compression packages.

Furthermore, the blockchain concurrent on-chain operation is executed on each file compression package, because there is no dependent transaction relationship between each file compression package, so the concurrent on-chain operation on the file compression package can be executed. It is understandable that due to the existence of resource limitations such as the network bandwidth, the on-chain operation on multiple file compression packages can be executed in batches, the concurrent on-chain operation is executed on the compression packages in each batch, and by executing the concurrent on-chain operation, the on-chain efficiency of files is improved. That is, the blockchain concurrent on-chain operation is executed on the file compression packages. Transmit the file compression packages onto a blockchain, and obtain hash values corresponding to the file compression packages, wherein an on-chain operation is executed using the file compression packages as a transaction, and the hash value returned corresponding to the transaction from the blockchain is obtained. The hash value is the hash value corresponding to the file compression package, that is, the hash value corresponding to the file compression package is obtained. The blockchain used may be a consortium chain, a private chain, etc. The type of blockchain is not limited in the disclosure. The specific tools or methods for executing the blockchain on-chain operation are not limited in the disclosure.

Step S102: generating first data blocks for a file name and a hash value of a first file compression package in the at least two file compression packages, and transmitting the first data block onto a blockchain; generating second data blocks for a second file compression package in the at least two file compression packages excluding the first file compression package according to a hash value of a previous data block, a file name and a corresponding hash value of the second file compression package, and transmitting the second data blocks onto a blockchain.

Specifically, according to the file names and the hash values of the file compression packages comprised in the file compression packages formed in Step S101, wherein the file names of the file compression packages are used for uniquely identifying the file compression packages, file compression packages corresponding to the file names can be obtained, thereby obtaining the files in the file compression file packages. The naming rule of the file names of the file compression packages is not limited in the present disclosure.

Further, generating first data blocks for a file name and a hash value of a first file compression package in the at least two file compression packages, and transmitting the first data block onto a blockchain. Specifically, obtaining the file name and the hash value of the first file compression package in at least two file compression packages and generating first data blocks, wherein the first data block is an initial data block, and include an identifier indicating that it is an initial data block. That is, the first data block further includes an initial data block identifier.

Figure 3:
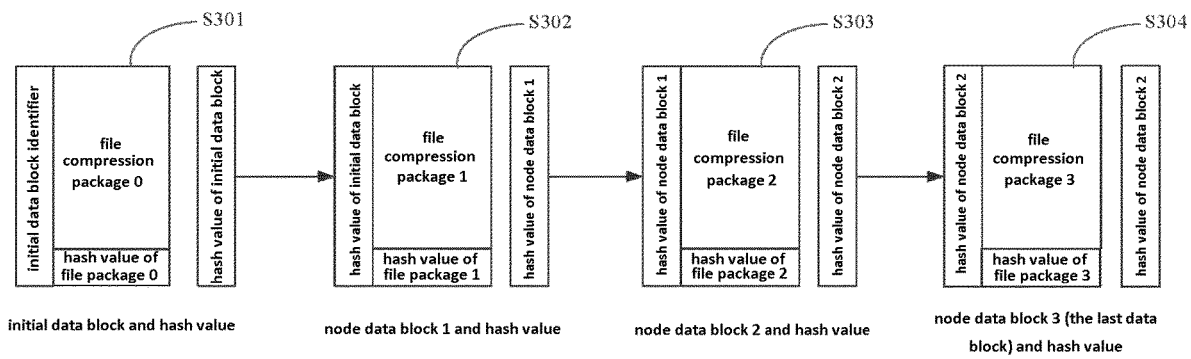
FIG. 3 is a schematic diagram of a chain data structure for generating and storing shared file data blocks provided by the first embodiment of the present disclosure.

The above steps are explained below using the embodiment illustrated in FIG. 3:

As shown in FIG. 3, forming the first data blocks according to file compression package 0 (that is, the first file compression package) and the hash value of file compression package 0 (that is, the hash value corresponding to the first file compression package), wherein the first data block is an initial data block, and the first data block includes an initial data block identifier. The specific naming rule and content of the initial data block identifier are not limited in this disclosure.

Further, generating the second data blocks (node data blocks 1); according to the hash value of the initial data block, file compression package 1 (that is, the file name of the second file compression package), the hash value of file compression package 1 (the hash value corresponding to the second file compression package), generating node data blocks 1, where the hash value of the initial data block are the hash values of the previous data block of node data blocks 1 (the second data blocks); node data blocks 1 is the second file compression package in the at least two file compression packages excluding the first file compression package (file compression package 0) in the at least two file compression packages; i.e., generating first data blocks for a file name and a hash value of a first file compression package in the at least two file compression packages, and transmitting the first data block onto a blockchain.

Generating second data blocks for a second file compression package in the at least two file compression packages excluding the first file compression package according to a hash value of a previous data block, a file name and a corresponding hash value of the second file compression package, and transmitting the second data blocks onto a blockchain. The hash value of the previous data block is obtained after the previous data block is on-chain, for example, the previous data block is on-chain as a transaction, and the return value of the transaction is obtained as the hash value of the previous data block; similarly, the hash values of the one or more second data blocks are obtained from the blockchain after the second data blocks are on-chain.

It can be understood that since the first data block (that is, the initial data block) does not contain the hash values of the previous data block, the initial data block as the initial data block contains the initial data block identifier; wherein other data blocks than the first data block are all second data blocks; it can be understood that based on the first data block, one or more second data blocks form a one-way linked list storage structure. Further, the second data blocks can be generated with two methods: The description of the first method is consistent with step S301-step S304 in the example in FIG. 3, and the description of the second method is consistent with step S501-step S504 in the example in FIG. 5, and will not be repeated here.

Step S103: using a hash value of a last second data block in the second data blocks as a root hash value, and transmitting the root hash value.

Specifically, use a hash value of a last second data block in the second data blocks as a root hash value, and send the root hash value. As can be seen from the depiction of Step S102, the first data block and one or more second data blocks form a one-way linked list structure, which contains the first data block (initial data block) and a plurality of second data blocks, wherein a hash value of a last second data block in the second data blocks is used as a root hash value, and the root hash value is transmitted.

There are two methods for transmitting the root hash value: (1) send the root hash value to an acquirer who has access to obtaining the shared files through the blockchain; (2) send the root hash value to an acquirer who has access to obtaining the shared files by other means, such as official emails etc. It can be understood that the root hash value is transmitted to an acquirer who has access to obtaining the shared files, and the acquirer that has access can be one or more parties. The files are statement files generated between Bank A and Bank B within one hour for example. The root hash value is generated after Step S101-Step S103, then the root hash value is transmitted to bank A and bank B that have access to these statement files. Obviously, the operation further improves the security of the files.

Figure 2:
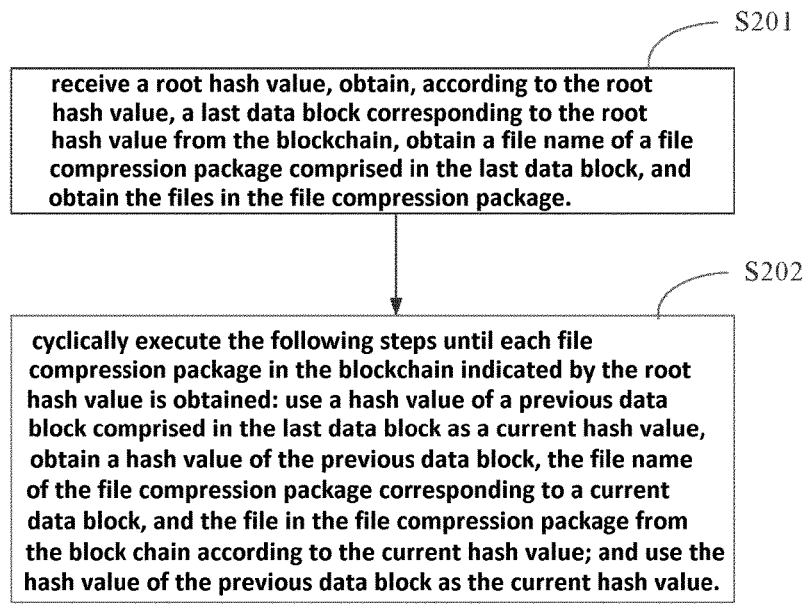
FIG. 2 is a schematic diagram of a flow of obtaining shared files provided by an embodiment of the present disclosure.

As shown in FIG. 2, the embodiment of the present disclosure provides a file sharing method, and the method may comprise the following steps:

Step S201: receiving a root hash value, obtaining a last data block corresponding to the root hash value from the blockchain according to the root hash value, obtaining a file name of a file compression package comprised in the last data block, and obtaining the files in the file compression package.

Specifically, according to the root hash value, obtaining a last data block corresponding to the root hash value from the blockchain, where further obtain the file names of files comprised in the file compression package, and obtain the files in the file compression package. The description about obtaining the files from the blockchain is consistent with the example described in step S401 or step S601, and will not be repeated here.

Step S202: cyclically executing the following steps until each file compression package in the blockchain indicated by the root hash value is obtained: using a hash value of a previous data block comprised in the last data block as a current hash value, obtaining a hash value of the previous data block, the file name of the file compression package corresponding to a current data block, and the files in the file compression package from the blockchain according to the current hash value; and using the hash value of the previous data block as the current hash value.

Specifically, there are two methods for cyclically executing the following steps until each file compression package in the blockchain indicated by the root hash value is obtained: the first method is consistent with the example described in steps S402-step S404, and will not be repeated here; the second method is consistent with the example described in step S602-step S604, and will not be repeated here.

As shown in FIG. 3, the embodiment of the present disclosure provides a method for storing shared files using a one-way chain data structure, and the method may comprise the following steps:

Before step S301-step S304, it is assumed that each compressed file has been generated and linked.

Step S301: generating a first data block.

Specifically, forming a first data block according to file compression package 0 and the hash value of file compression package 0, the first data bloc is an initial data block, and the first data block contains an initial data block identifier. The specific content of the initial data block identifier is not limited in the disclosure. That is, the first data block further comprises an initial data block identifier.

File compression package 0 is the filename of the file compression package; and file compression package 0 is the first file compression package. That is, generate the first data block for a file name and a hash value of a first file compression package in the at least two file compression packages, and transmitting the first data blocks onto a blockchain.

Step S302: generating second data blocks (node data blocks 1).

Specifically, generating second data blocks according to the hash value of the previous data block, the file name of the second file compression package, and the hash value corresponding to the second file compression package. As shown in the example of FIG. 3, generate node data blocks 1 according to the hash value of the initial data block, file compression package 1, and the hash value corresponding to file compression package 1. File compression package 1 is the file name of the second file compression package; the hash value of the initial data block is the hash value of the previous data block of node data blocks 1 (the second data blocks); the hash value of file compression package 1 is the hash value corresponding to the second file compression package.

Step S303: generating second data blocks (node data blocks 2).

Specifically, as shown in the example of FIG. 3, generating node data blocks 2 according to the hash value of node data block 1, file compression package 2, and the hash value of file compression package 2, where file compression package 2 is the file name of the second file compression package, the hash value of node data block 1 is the hash value of the previous data block of node data blocks 2 (second data blocks); the hash value of file compression package 2 is the hash value corresponding to the second file compression package.

Step S304: generating second data blocks (node data blocks 3).

Specifically, as shown in the example of FIG. 3, generate node data block 3 according to the has value of node data block 2, file compression package 3, and the has value of file compression package 3, where file compression package 3 is the file name of the second file compression package, the hash value of node data block 2 is the hash value of the previous data block of node data blocks 3 (second data blocks); and the hash value of file compression package 3 is the hash value corresponding to the second file compression package.

Step S302-Step S304 depict the flow of generating multiple second data blocks, i.e., generating second data blocks for a second file compression package in the at least two file compression packages excluding the first file compression package according to the hash value of a previous data block, a file name and a corresponding hash value of the second file compression package, and transmitting the second data blocks onto a blockchain.

Further, assuming that node data block 3 is the last second data block, use the hash value of node data blocks 3 as the root hash value, and send the root hash value. That is, use the hash value of the last second data block in the second data blocks as the root hash value, and send the root hash value.

Steps S301-Step S304 explains the process of generating data blocks and associating two data blocks through the hash values of the data blocks as examples, and further store each data block using a linked list data structure. The number of the data blocks and the specific content of the file compression package comprised in the data blocks are not limited in the disclosure.

Figure 4:
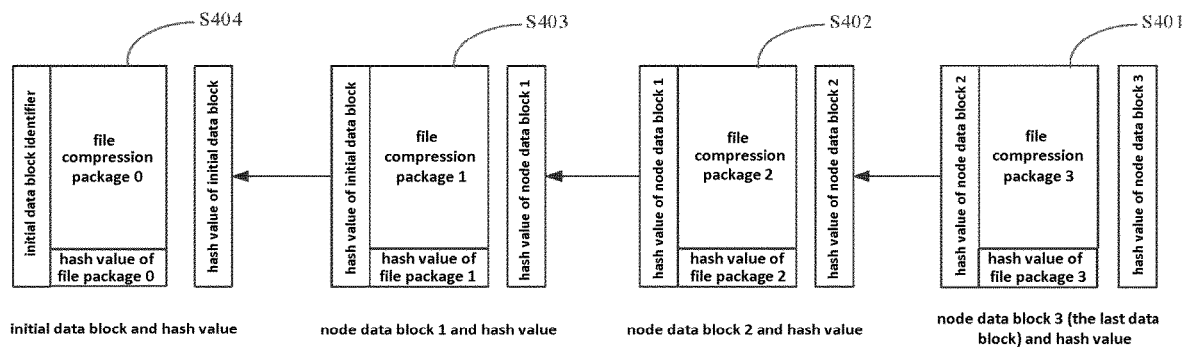
FIG. 4 is a schematic diagram of a flow of obtaining shared files provided by the first embodiment of the present disclosure.

As shown in FIG. 4, the embodiment of the present disclosure provides a method for obtaining shared files based on a one-way chain data structure, and the method may comprise the following steps:

The following steps S401-step S404 correspond to the example described in step S301-step S304 to illustrate the method for obtaining shared files.

Step S401: obtaining the file comprised in the last data block (node data block 3) according to the received root hash value.

Specifically, as can be known according to the description of step S304, node data block 3 as shown in FIG. 4 is the last data block, and the node data block 3 hash value of node data block 3 is the root hash value. Receive the root hash value; according to the root hash value, obtain the last data block (node data block 3) corresponding to the root hash value from the blockchain, and obtain the file name of the file compression package comprised in node data block 3 (file compression package 3 is the file name of the file compression package), obtain the file compression package according to the file name of the file compression package, and then obtain each file in the file compression package by decompression. That is, receive the root hash value, obtain the last data block corresponding to the root hash value from the blockchain according to the root hash value, obtain the file name of the file compression package comprised in the last data block, and obtain the files in the file compression package.

Step S402: obtaining the file comprised in the previous data block (node data block 2) of the last data block.

Specifically, as shown in FIG. 4, through step S401, obtaining the hash value of node data block 2 comprised in node data block 3 (the last data block); use the hash value of node data block 2 (the hash value of the previous data of the last data block) (the obtained hash value of the previous data block) as the current hash value; according to the hash value of node data block 2, obtaining the file name (file compression package 2) of the file compression package comprised in node data block 2 from the blockchain, and obtaining the files in the file compression package (file compression package 2); wherein the hash value of node data block 2 is the hash value of the previous data block of the last data block, and file compression package 2 is the file name of the file compression package.

Step S403: obtaining the files comprised in the previous data block (node data block 1).

Specifically, as shown in FIG. 4, through Step S402, obtaining the hash value of node data block 1 comprised in node data block 2; according to the hash value of node data block 1, obtaining the file name of the file compression package (file compression package 1) comprised in node data block 1, and obtaining the files in the file compression package (file compression package 1); wherein, the hash value of node data block 1 is the hash value of the previous data block 2 of node data block 2; use the hash value of node data block 1 as the current hash value; and file compression package 1 is the file name of the file compression package.

Step S404: obtaining the files corresponding to the initial data block.

Specifically, as shown FIG. 4, through step S403, obtaining the hash value of the initial data blocks comprised in node data block 1; using the hash value of the initial data block as the current hash value; according to the hash value of the initial data block, obtain the file name of the file compression package comprised in the initial data block (file compression package 0) from the blockchain, and obtain the files in the file compression package (file compression package 0); the hash value of the initial data block is the hash value of the previous data block of node data block 1; file compression file package 0 is the file name of the file compression file package.

It can be understood that when obtaining the initial data block identifiers indicated as the initial data blocks, the hash value of the previous data block does not exist in the file compression file package comprised in the initial data blocks, stop obtaining the previous data block and indicate that the process of each file compression package in the linked list structure; that is, when the current data blocks contain the initial data block identifiers, indicating each file compression package in the blockchain indicated by the root hash value is completed.

Steps S401-Step S404 describe obtaining files in the file compression package, that is, cycling the following steps until each file compression package in the blockchain indicated by the root hash value is obtained: using a hash value of a previous data block comprised in a last data block as a current hash value, and obtaining a hash value of the previous data block, the file name of the file compression package corresponding to the current data block, and the files in the file compression packages from the blockchain according to the current hash value; and using the hash value of the previous data block as the current hash value.

Further, execute decompression and decryption operations on the obtained file compression package to obtain the files in the file compression package. Specifically, the method for executing decompression and decryption operations on the file compression package corresponds to the method for compression and encryption operations one by one. The disclosure does not limit the specific methods for compression, decompression, encryption and decryption.

Figure 5:
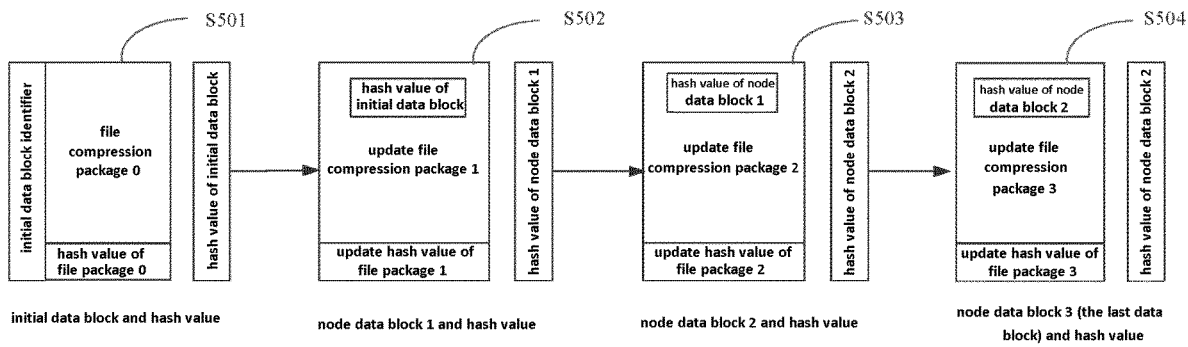
FIG. 5 is a schematic diagram of a chain data structure for generating and storing shared file data blocks provided by the second embodiment of the present disclosure.

As shown in FIG. 5, the embodiment of the present disclosure provides a method for storing shared files using a one-way chain data structure, and the method may comprise the following steps:

Step S501: generating a first data block (initial data block).

Specifically, the description of generating the first data blocks is consistent with that of step S301, and will not be repeated here.

Step S502: generating second data blocks (node data blocks 1).

Specifically, the first method of generating node data blocks 1 (second data blocks) according to file compression package 1 (the file name of the second file compression package), the hash value of file compression package 1 (the hash value corresponding to the second file compression package), and the hash value of the initial data block (the hash value of the previous data block) is described as Step S302. The second method of generating node data blocks 1 (second data blocks) according to file compression package 1 (the file name of the second file compression package), the hash value of file compression package 1 (the hash value corresponding to the second file compression package), and the hash value of the initial data block (the hash value of the previous data block) is described as follows:

According to the file name of the second file compression package (for example, file compression package 1), obtaining the shared files comprised in the second file compression package, and executing compression and encryption operations on the shared files and the hash value of the previous data block (initial data block) to form an update file compression package (for example, update file compression package 1), transmitting the update file compression package onto a blockchain (that is, the hash value of update file compression package 1), and further forming the second data blocks (for example, node data block s1) according to the update file compressed package 1 and the hash value of update file compression package 1.

Step S503: generating second data blocks (node data blocks 2).

Specifically, the first method of generating node data blocks 2 (second data blocks) according to file compression package 2 (the file name of the second file compression package), the hash value of file compression package 2 (the hash value corresponding to the second file compression package), and the hash value of the initial data block (the hash value of the previous data block) is described as Step S303. The second method of generating node data block 2 (second data block) according to file compression package 2 (the file name of the second file compression package), the hash value of file compression package 2 (the hash value corresponding to the second file compression package), and the hash value of the initial data block (the hash value of the previous data block) is described is described as follows:

According to the file name of the second file compression package (for example, file compression package 2), obtaining the shared files comprised in the second file compression package, and executing compression and encryption operations on the shared files and the hash value of the previous data block (node data blocks 1) to form an update file compression package (for example, update file compression package 2), transmitting the update file compression package onto a blockchain (that is, the hash value of update file compression package 2), and forming the second data blocks (for example, node data blocks 2) according to the update file compressed package 1 and the hash value of update file compression package 2.

Step S504: generating second data blocks (node data blocks 3).

Specifically, the first method of generating node data blocks 3 (second data blocks) according to file compression package 3 (the file name of the second file compression package), the hash value of file compression package 3 (the hash value corresponding to the second file compression package), and the hash value of the node data block 2 (the hash value of the previous data block) is described as Step S303. The second method of generating node data blocks 2 (second data blocks) according to file compression package 2 (the file name of the second file compression package), the hash value of file compression package 2 (the hash value corresponding to the second file compression package), and the hash value of the initial data block (the hash value of the previous data block) is similar as Step S503 and not repeated here:

Step S502-Step S504 describe the procedures of generating second data blocks, that is, for a second file compression package in the at least two file compression packages excluding the first file compression package: according to a hash value of a previous data block, a file name and a corresponding hash value of the second file compression package, generating the second data blocks further comprises: obtaining shared files comprised in the second file compression package according to the file name of the second file compression package, executing compression and encryption operations on the shared files and the hash value of the previous data block, forming an update file compression package, transmitting the update file compression package onto a blockchain, obtaining a hash value corresponding to the update file compression package, and generating second data blocks according to the file name and the hash value of the update file compression package.

Further, as shown in FIG. 5, node data blocks 3 is the last second data block in the second data blocks, the hash value of the last second data block in the second data blocks is used as the root hash value and the root hash value is transmitted. That is, use the hash value of the last second data block in the second data blocks as the root hash value, and send the root hash value.

Steps S501 to S504 explain the second method for generating data blocks as examples. It can be understood that the number of data blocks and the specific content of the file compression packages comprised in the data blocks are not limited in the present disclosure.

Figure 6:
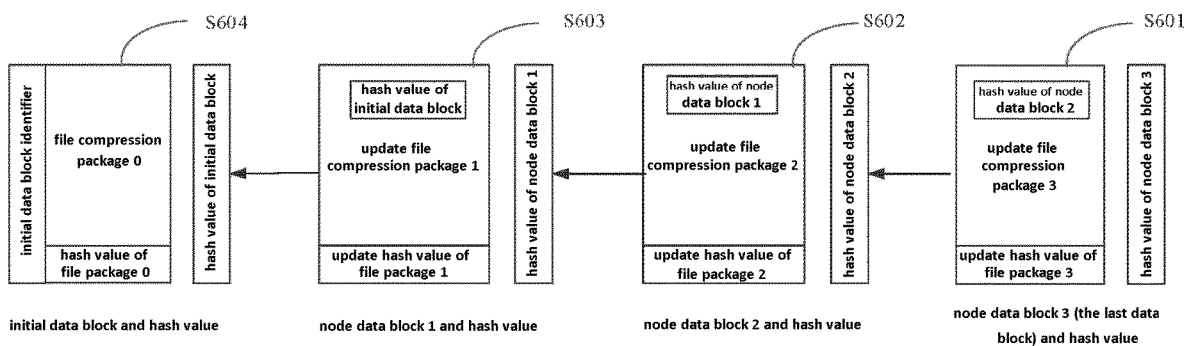
FIG. 6 is a schematic diagram of a flow of obtaining shared files provided by the second embodiment of the present disclosure.

As shown in FIG. 6, the embodiment of the present disclosure provides a method for obtaining shared files based on a one-way chain data structure, and the method may comprise the following steps:

The following Step S601-Step S604 correspond to the embodiment described in Step S501-Step S504 to illustrate the method for obtaining shared files.

Step S601: obtaining the files comprised in the last data block (node data blocks 3) according to the received root hash value.

Specifically, obtaining the file name (that is, update file compression package 3) of the file compression package comprised in the last data block (node data blocks 3), and according to update file compression package 3, obtaining the file compression package corresponding to the file name "update file compression package 3", executing decompression and decryption operations on the file compression package, obtaining the hash value of the previous data block (node data blocks 2) comprised in the file package decompressed and decrypted, and using the hash value of node data blocks 2 as the current hash value, that is, using the hash value of the previous data block comprised in the last data block as the current hash value. In other words, receiving the root hash value, obtaining the last data block corresponding to the root hash value from the blockchain according to the root hash value, obtaining the file name of the file compression package comprised in the last data block, and obtaining the files in the file compression package.

Further, when the file compression package contains the hash value of the previous data block, decompression and decryption operation is executed on the file compression package to obtain the hash value of the previous data block.

Step S602: obtaining the files comprised in the previous data block (node data blocks 2) of the last data block.

Specifically, as shown in FIG. 6, through step S601, obtaining the hash value of node data blocks 2 comprised in node data block 3 (the last data block), wherein node data block 2 is the previous data block of the last data block, further, according to the hash value of node data block 2, obtaining the file name (update file compression package 2) of the file compression package corresponding to node data block 2; and obtaining the files in the file compression package; execute decompression and decryption operations on the file compressed package (update file compression package 2), and obtaining the hash value of the previous data block (node data blocks 1) comprised in the file package decompressed and decrypted; that is, when the file compression package contains the hash value of the previous data block, decompression and decryption operation is executed on the file compression package to obtain the hash value of the previous data block.

Further, using a hash value of node data block 2 as a current hash value, and obtaining a hash value (the hash value of node data block 1, where node data block 1 is the previous data block of node data block 2) of the previous data block, the file name of the file compression package corresponding to the current data block (node data block 2), and the files in the file compression packages according to the current hash value from blockchain.

Step S603: obtaining the files comprised in the previous data block (node data block 1).

Specifically, similar to step S602, node data block 1 is the previous data block of node data block 2. As shown in FIG. 6, according to the hash value of node data block 1, obtaining the file name of the file compression package corresponding to the current data block (node data block 1) and the files in the file compression package (the files in update file compression package 1).

Decompression and decryption operations is executed on the file compression package (update file compression package 1), obtain the hash value of the previous data block (initial data block) comprised in the file package decompressed and decrypted, and the hash value of node data block 1 is used as the current hash value; that is, when the file compression package contains the hash value of the previous data block, decompression and decryption operation is executed on the file compression package to obtain the hash value of the previous data block.

Step S604: obtaining the files comprised in the previous data block (initial data block).

Specifically, similar to step S603, initial data block 1 is the previous data block of node data block 1. As shown in FIG. 6, according to the hash value of the initial data block, obtaining the file name of the compressed file package corresponding to the current data block (initial data block 1) and the files in the file compression package (the files in file compression package 0). It can be understood that the initial data block contains the initial data block identifier; further, when the current data block contains an initial data block identifier, indicate that the obtaining of each file compression package in the blockchain indicated by the root hash value is completed.

After the cyclic operations of steps S601-S604 from the last data block to the initial data block, according to the hash value of each data block until each file compression package in the blockchain indicated by the root hash value is obtained. That is, cyclically execute the following steps until each file compression package in the blockchain indicated by the root hash value is obtained: using a hash value of a previous data block comprised in a last data block as a current hash value, and obtaining a hash value of the previous data block, the file name of the file compression package corresponding to the current data block, and the files in the file compression packages from the blockchain according to the current hash value; and using the hash value of the previous data block as the current hash value.

Further, the obtaining the files in the file compression package, comprises executing decompression and decryption operations on the file compression package to obtain the files in the file compression package. The method for decompression and decryption of the file compression package is in one-to-one correspondence with the method for compression and encryption of the file compression package, and this disclosure does not limit the specific methods of compression, decompression, encryption, and decryption.

Figure 7:
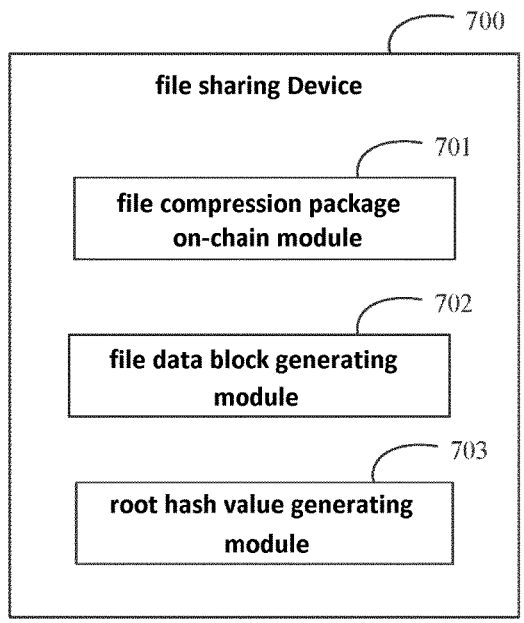
FIG. 7 is a schematic structural diagram of a file sharing apparatus provided by an embodiment of the present disclosure.

As shown in FIG. 7, an embodiment of the present disclosure provides file sharing apparatus 700, comprising file compression package on-chain module 701, file data block generating module 702, and root hash value generating module 703, wherein file compression package on-chain module 701 is used for obtaining files to be shared and forming at least two file compression packages; and transmitting the file compression packages onto a blockchain, and obtaining hash values corresponding to the file compression packages;

file data block generating module 702 is used for generating first data blocks for a file name and a hash value of a first file compression package in the at least two file compression packages, and transmitting the first data block onto a blockchain; generating second data blocks for a second file compression package in the at least two file compression packages excluding the first file compression package according to a hash value of a previous data block, a file name and a corresponding hash value of the second file compression package, and transmitting the second data blocks onto a blockchain; and root hash value generating module 703 for using a hash value of a last second data block in the second data blocks as a root hash value, and transmitting the root hash value.

Optionally, file compression package on-chain module 701 is further for obtaining files to be shared and forming at least two file compression packages, comprising obtaining the files to be shared within a predefined time range and forming at least two file compression packages, and determining a number of files in the file packages according to a network bandwidth.

Optionally, file compression package on-chain module 701 is further for obtaining files to be shared and forming at least two file compression packages, comprising: executing compression and encryption operations on the file packages respectively to form the file compression packages.

Optionally, file data block generating module 702 further comprises that the first data block further include an initial data block identifier.

Optionally, file compression package on-chain module 701 further comprises concurrently transmitting the file compression packages onto a blockchain.

Optionally, file data block generating module 702 is further used for the generating second data blocks for a second file compression package in the at least two file compression packages excluding the first file compression package according to a hash value of a previous data block, a file name and a corresponding hash value of the second file compression package further comprising: obtaining shared files comprised in the second file compression package according to the file name of the second file compression package, executing compression and encryption operations on the shared files and the hash value of the previous data block, forming an update file compression package, transmitting the update file compression package onto a blockchain, obtaining a hash value corresponding to the update file compression package, and generating second data blocks according to the file name and the hash value of the update file compression package.

Figure 8:
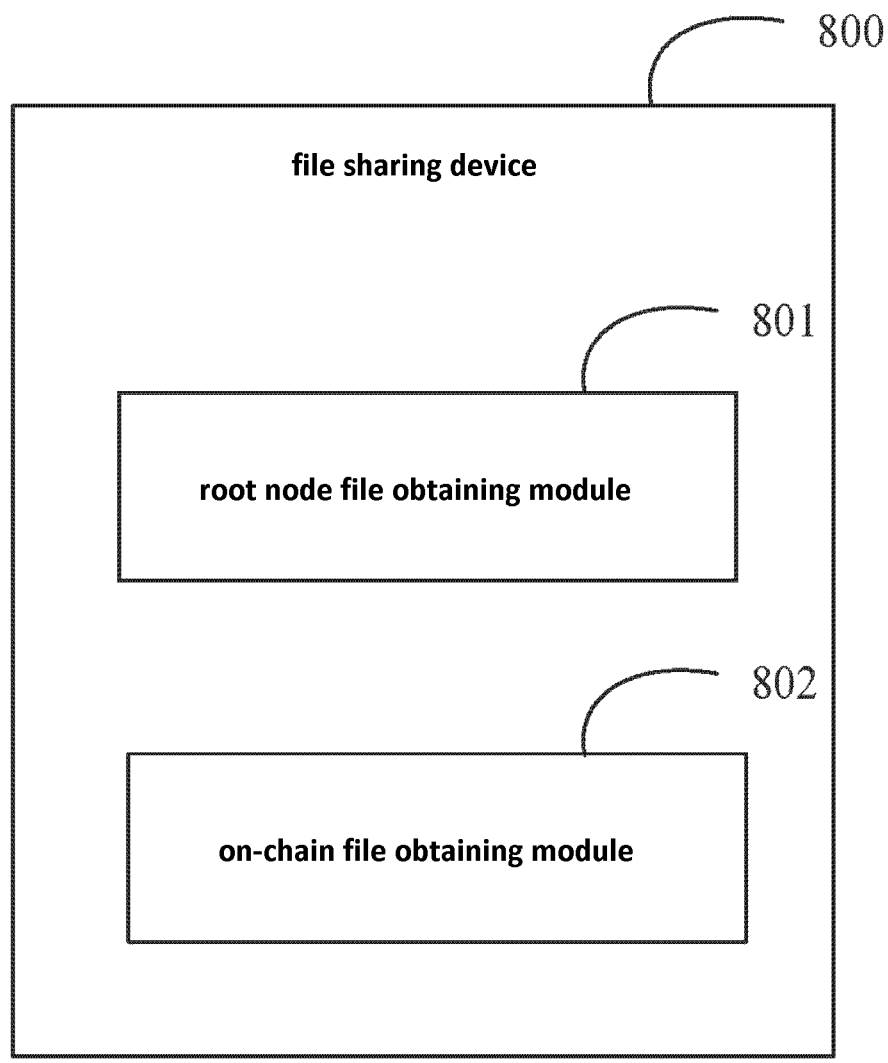
FIG. 8 is a schematic structural diagram of a apparatus for obtaining shared files provided by an embodiment of the present disclosure.
Figure 9:
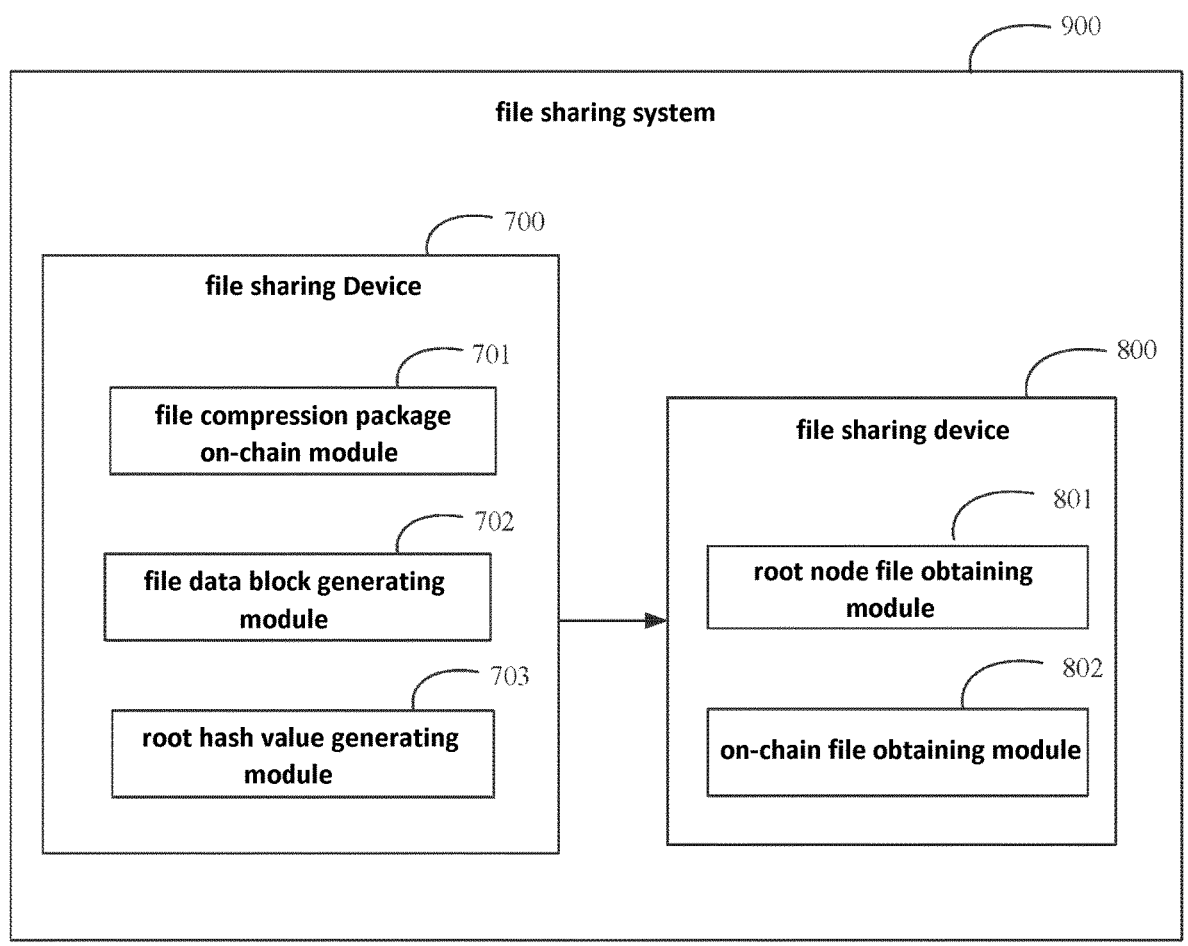
FIG. 9 is a schematic structural diagram of a system for obtaining shared files provided by an embodiment of the present disclosure.

As shown in FIG. 8, an embodiment of the present disclosure provides file sharing apparatus 800, comprising root node file obtaining module 801 and on-chain file obtaining module 802, wherein:

root node file obtaining module 801 is used for receiving a root hash value, obtaining a last data block corresponding to the root hash value from the blockchain according to the root hash value, obtaining a file name of a file compression package comprised in the last data block, and obtaining the files in the file compression package; and on-chain file obtaining module 802 is used for cyclically executing the following steps until each file compression package in the blockchain indicated by the root hash value is obtained: using a hash value of a previous data block comprised in the last data block as a current hash value, obtaining a hash value of the previous data block, the file name of the file compression package corresponding to a current data block, and the files in the file compression package from the blockchain according to the current hash value; and using the hash value of the previous data block as the current hash value.

Optionally, on-chain file obtaining module 802 is further used for when the current data block contains an initial data block identifier, indicating that the obtaining of each file compression package in the blockchain indicated by the root hash value is completed.

Optionally, on-chain file obtaining module 802 is further used for obtaining the files in the file compression package, comprises executing decompression and decryption operations on the file compression package to obtain the files in the file compression package.

Optionally, the on-chain file obtaining module 802 is further used for executing decompression and decryption operation on the file compression package to obtain the hash value of the previous data block when the file compression package contains the hash value of the previous data block.

Figure 10:
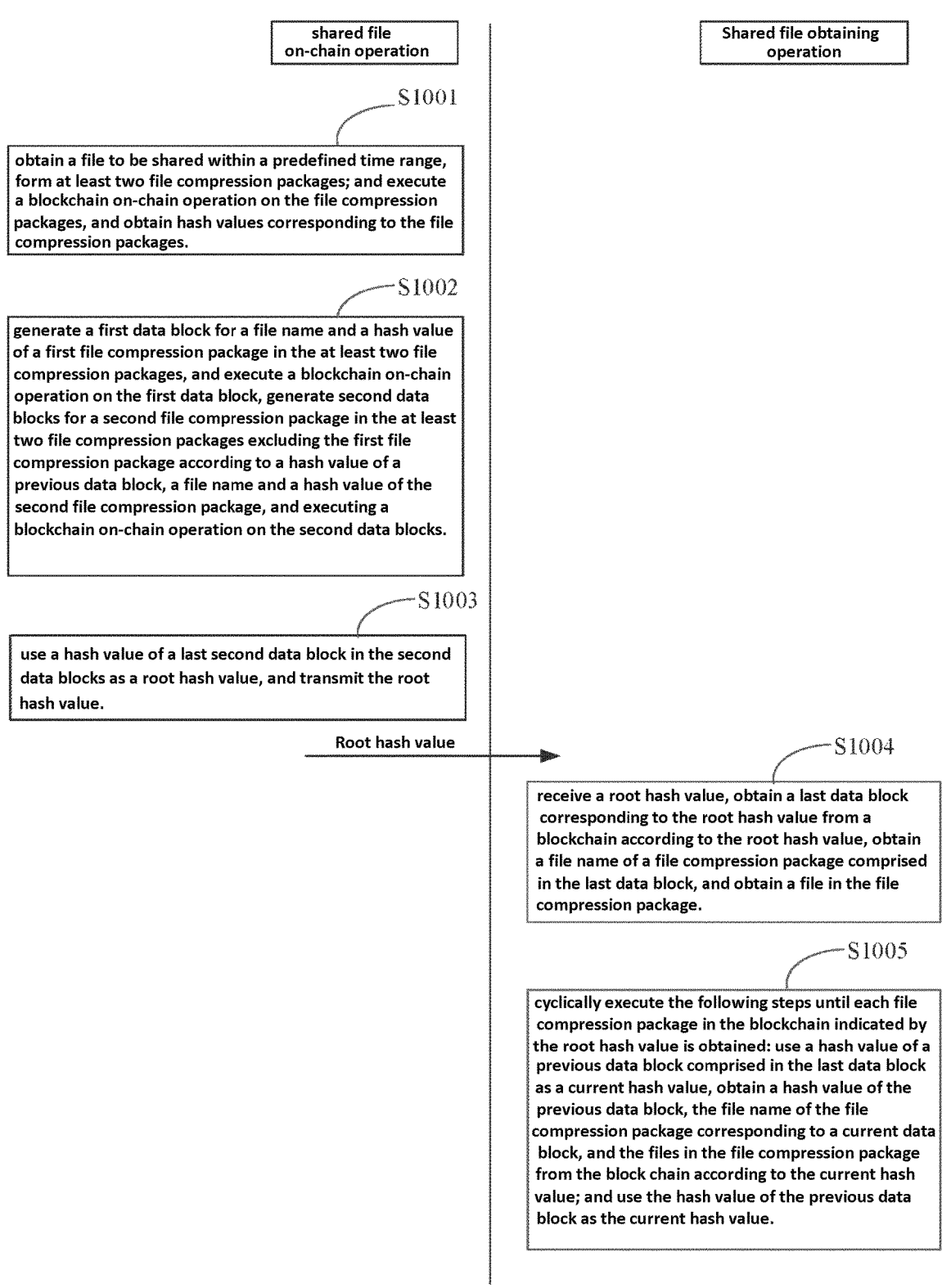
FIG. 10 is a schematic diagram of a flow of sharing files provided by an embodiment of the present disclosure.

As shown in FIG. 10, the embodiment of the present disclosure provides a file sharing process, which may comprise the following steps:

As shown in the schematic flow chart in FIG. 10, Steps S1001-Step S1003 describe the shared file on-chain process, and Step S1004-Step S1005 describe the process of obtaining shared files by a shared file acquirer. For example, a bank headquarter executes the shared file on-chain process, cooperative bank 1 and bank 2 that directly relate to the shared files in business may be acquirers of the shared files, and statements between bank 1 and bank 2 are the shared files. It can be understood that bank 1 and bank 2 are acquirers who have access to the shared files.

Step S1001: obtaining files to be shared within a predefined time range, forming at least two file compression packages; and transmitting the file compression packages onto a blockchain, and obtaining hash values corresponding to the file compression packages.

Specifically, the depiction about forming the file compression packages and the on-chain operation is consistent with Step S101, and is not repeated here. Further, obtaining files to be shared and forming at least two file compression packages comprises: obtaining files to be shared within a predefined time range, forming at least two file compression packages, and determining a number of files in the file packages according to a network bandwidth; executing compression and encryption operations on the file packages respectively to form the file compression packages; and concurrently transmitting the file compression packages onto a blockchain.

Step S1002: generating a first data block for a file name and a hash value of a first file compression package in the at least two file compression packages, and transmitting the first data block onto a blockchain.

For a second file compression package in the at least two file compression packages excluding the first file compression package: according to a hash value of a previous data block, a file name and a corresponding hash value of the second file compression package, generating second data blocks and transmitting the second data blocks onto a blockchain. Specifically, the description about generating the data blocks is consistent with that of step S102, and will not be repeated here.

Further, the generating second data blocks for a second file compression package in the at least two file compression packages excluding the first file compression package according to a hash value of a previous data block, a file name and a corresponding hash value of the second file compression package further comprises: obtaining shared files comprised in the second file compression package according to the file name of the second file compression package, executing compression and encryption operations on the shared files and the hash value of the previous data block, forming an update file compression package, transmitting the update file compression package onto a blockchain, obtaining a hash value corresponding to the update file compression package, and generating second data blocks according to the file name and the hash value of the update file compression package.

Step S1003: executing a blockchain on-chain operation on the hash value corresponding to the file compression package, the first data block and the corresponding hash value, the second data blocks and the corresponding hash values; and using a hash value of a last second data block in the second data blocks as a root hash value, and transmitting the root hash value.

Specifically, the description about transmitting the root hash value is consistent with that of step S103, and will not be repeated here.

Step S1004: receiving a root hash value, obtaining a last data block corresponding to the root hash value from the blockchain according to the root hash value, obtaining a file name of a file compression package comprised in the last data block, and obtaining the files in the file compression package.

Specifically, the description about the two methods for obtaining the files comprised in the data blocks according to the root hash value is consistent with that of step S201, and will not be repeated here.

Step S1005: cyclically executing the following steps until each file compression package in the blockchain indicated by the root hash value is obtained: using a hash value of a previous data block comprised in the last data block as a current hash value, obtaining a hash value of the previous data block, the file name of the file compression package corresponding to a current data block, and the files in the file compression package from the blockchain according to the current hash value; and using the hash value of the previous data block as the current hash value.

Specifically, the descriptions of the two methods for cyclically obtaining each file compression package in the blockchain indicated by the root hash value are consistent with step S202, and will not be repeated here.

An embodiment of the present disclosure also provides a file sharing electronic apparatus, comprising: one or more processors; storage means for storing one or more programs when executed by the one or more processors to cause the one or more processors to implement the method provided by any one of the above embodiments.

An embodiment of the present disclosure further provides a computer-readable medium, on which a computer program is stored, wherein, when the program is executed by a processor, the method provided by any of the foregoing embodiments is implemented.

Figure 11:
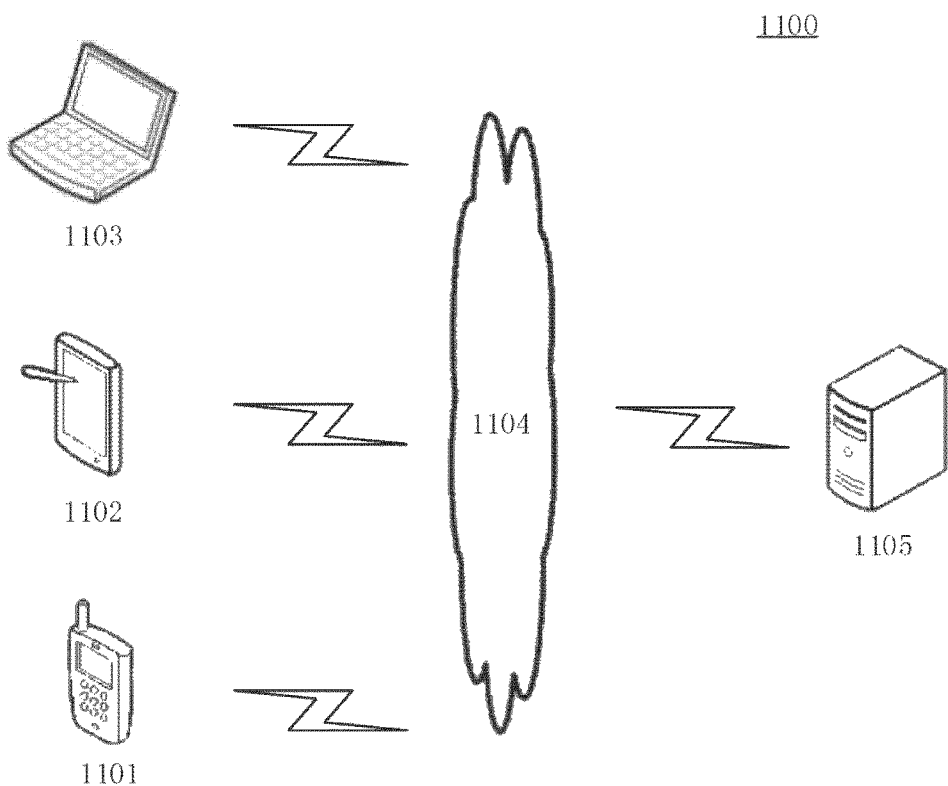
FIG. 11 is an architecture diagram of an exemplary system to which embodiments of the present disclosure can be applied.

FIG. 11 shows an exemplary system architecture 1100 to which the file sharing method or the file sharing apparatus to which the embodiments of the present disclosure can be applied.

As shown in FIG. 11, system architecture 1100 may comprise terminal apparatuses 1101, 1102, and 1103, network 1104 and server 1105. Network 1104 is used to provide a communication link medium between terminal apparatuses 1101, 1102, 1103 and server 1105. Network 1104 may include various connection types, such as wired, wireless communication links, or fiber optic cables, etc.

Users can interact with server 1105 with terminal apparatuses 1101, 1102, 1103 over network 1104 to receive or send messages and the like. Various client applications may be installed on terminal apparatuses 1101, 1102, and 1103, such as enterprise application clients, web browser applications, search applications, instant messaging tools, and email clients.

Terminal apparatuses 1101, 1102, 1103 may be various electronic apparatuses with display screens and supporting the running of various client applications, including but not limited to smart phones, tablet computers, laptop computers, desktop computers and so on.

Server 1105 may be a server that provides various services, for example, a background management server that provides support for requests made by users to obtain files using terminal apparatuses 1101, 1102, and 1103. The background management server can execute an on-chain operation and store the files to be shared, process the requests for obtaining the files, and return the files to the terminal apparatus.

It should be noted that the file sharing method provided by the embodiments of the present disclosure is generally executed by server 1105, and correspondingly the file sharing apparatus is generally arranged in server 1105.

It should be understood that the numbers of terminal apparatuses, networks and servers in FIG. 11 are only illustrative. According to the implementation needs, there can be any number of terminal apparatuses, networks and servers.

Figure 12:
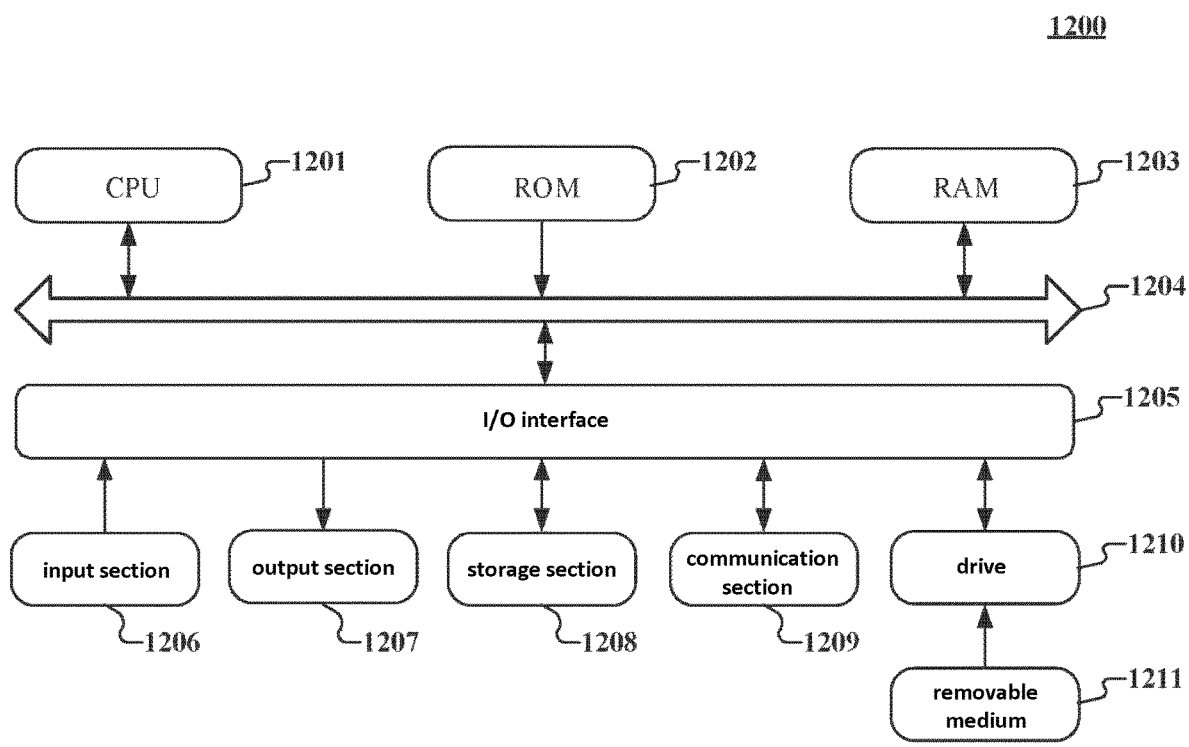
FIG. 12 is a schematic structural diagram of a computer system suitable for implementing a terminal apparatus or a server according to embodiments of the present disclosure.

Referring now to FIG. 12, it shows a schematic structural diagram of computer system 1200 suitable for implementing a terminal apparatus according to the embodiments of the present disclosure. The terminal apparatus shown in FIG. 12 is only an example, and should not limit the functions and application scope of this embodiment of the present disclosure.

As shown in FIG. 12, computer system 1200 comprises central processing unit (CPU) 1201 that can execute various appropriate actions and processes according to programs stored in read-only memory (ROM) 1202 or loaded from storage section 1208 into random-access memory (RAM) 1203. In RAM 1203, various programs and data necessary for the operation of system 1200 are also stored. CPU 1201, ROM 1202, and RAM 1203 are connected to each other via a bus 1204. Input/output (I/O) interface 1205 is also connected to bus 1204.

The following components are connected to I/O interface 1205: input section 1206 including a keyboard, a mouse, etc.; output section 1207 including a cathode ray tube (CRT), a liquid crystal display (LCD), etc., and a speaker; storage section 1208 including a hard disk, etc. and communication section 1209 including a network interface card such as a LAN card, a modem, or the like. Communication section 1209 executes communication processing via a network such as the Internet. Drive 1210 is also connected to I/O interface 1205 as needed. Removable medium 1211, such as a magnetic disk, an optical disk, a magneto-optical disk, a semiconductor memory, etc., is mounted on drive 1210 as necessary so that a computer program read therefrom is installed into storage section 1208 as necessary.

In particular, according to the disclosed embodiments of the present disclosure, the processes described above with reference to the aforesaid flowchart can be implemented as a computer software program. For example, the disclosed embodiment of the present disclosure comprises a computer program product, comprising a computer program carried on a computer-readable medium, where the computer program includes program codes for executing the method shown in the flowchart. In such an embodiment, the computer program may be downloaded and installed from network via communication portion 1209, and/or installed from removable media 1211. When this computer program is executed by central processing unit (CPU) 1201, the above-mentioned functions defined in the system of the present disclosure are executed.

It should be noted that the computer-readable medium shown in the present disclosure may be a computer-readable signal medium or a computer-readable storage medium or any combination of the above two. A computer readable storage medium may be, for example, but not limited to, an electrical, magnetic, optical, electromagnetic, infrared, or semiconductor system, apparatus, or apparatus, or any combination thereof. More specific examples of a computer-readable storage media may include, but are not limited to, electrical connections with one or more wires, portable computer diskettes, hard disks, random access memories (RAMs), read-only memories (ROMs), erasable programmable read-only memories (EPROMs or flash memories), optical fibers, portable compact disk read-only memories (CD-ROMs), optical storage apparatuses, magnetic storage apparatuses, or any suitable combination of the above. In the present disclosure, a computer-readable storage medium may be any tangible medium that contains or stores a program that can be used by or in conjunction with an instruction execution system, apparatus, or apparatus. In the present disclosure, however, a computer-readable signal medium may include a data signal propagated in baseband or as part of a carrier wave, and carry computer-readable program codes. Such propagated data signals may take many forms, including but not limited to electromagnetic signals, optical signals, or any suitable combination of the foregoing. A computer-readable signal medium may also be any computer-readable medium other than a computer-readable storage medium, which can send, propagate, or transmit a program for use by or in conjunction with an instruction execution system, apparatus, or apparatus. Program codes comprised on a computer readable medium may be transmitted using any appropriate medium, including but not limited to wireless, wires, optical fiber cables, RF, etc., or any suitable combination of the foregoing.

The flowcharts and block diagrams in the drawings illustrate the architecture, functionality, and operation of possible embodiments of systems, methods and computer program products according to various embodiments of the present disclosure. In this regard, each block in a flowchart or block diagram may represent a module, a program segment, or portion of a code that includes one or more executable instructions for implementing specified logical functions. It should also be noted that, in some alternative embodiments, the functions noted in the blocks may occur out of the order noted in the figures. For example, two blocks shown in succession may, in fact, be executed substantially concurrently, or they may sometimes be executed in the reverse order, depending upon the functionality involved. It should also be noted that each block in the block diagrams or flowchart, and combinations of the blocks in the block diagrams or flowcharts, can be implemented by a dedicated hardware-based system that executes the specified functions or operations, or can be implemented by a combination of dedicated hardware and computer instructions.

The described modules and/or units involved in the embodiments of the present disclosure may be implemented by means of software or hardware. The described modules and/or units can also be set in a processor, for example, it can be described as a processor comprising a file compression package on-chain module, a file data block generating module, and a root hash value generating module. The names of these modules do not constitute a limitation of the modules themselves under certain circumstances. For example, the file data block generating module can also be described as "a module for forming data blocks according to the file compression package and the hash value of the previous data block". It can also be described as a processor comprising a root node file obtaining module and an on-chain file obtaining module. The names of these modules do not constitute a limitation on the modules themselves under certain circumstances. For example, the root node file obtaining module can also be described as "a module for obtaining the files comprised in the data block corresponding to the root hash value according to the root hash value".

As another aspect, the present disclosure also provides a computer-readable medium, which may be included in the apparatus described in the above embodiments, or may exist independently without being assembled into the apparatus. The above-mentioned computer-readable medium carries one or more programs, and when the above-mentioned one or more programs are executed by one such apparatus, the apparatus is caused to comprise: obtaining the files to be shared, executing the blockchain concurrent on-chain operation on the shared file compression package, forming data blocks according to the file name of the compression package and the hash value thereof, the data block also containing the hash value of the previous data block; the hash value of the last data block being the root hash value; according to the root hash value, obtaining the file comprised in the last data block, and when the data block contains the hash value of the previous data block, cyclically executing until each file compression package in the blockchain indicated by the root hash value is obtained.

According to the technical solutions of the embodiments of the present disclosure, by compressing multiple files into file packages, the technical problem of excessive burden on network resources caused by the large number of files is partially overcome. By putting each file compression package concurrently on chain, the file on-chain and sharing efficiency is improved; and by saving and sharing the files using the one-way linked list data structure on the blockchain, the security of files is improved. The specific implementation modes described above do not limit the protection scope of the present disclosure. It should be apparent to those skilled in the art that various modifications, combinations, sub-combinations and substitutions may occur depending on design requirements and other factors. Any modifications, equivalent replacements and improvements made within the spirit and principles of the present disclosure shall be included within the protection scope of the present disclosure.

What is claimed is:

1. A file sharing method, comprising:
   obtaining files to be shared and forming at least two file compression packages;
   transmitting the file compression packages onto a blockchain, and obtaining hash values corresponding to the file compression packages;
   generating a first data block based on a file name and a hash value of a first file compression package in the at least two file compression packages, and transmitting the first data block onto a blockchain;
   generating second data blocks based on a hash value of a previous data block, a file name and a hash value a corresponding to second file compression package wherein the second file compression packages are one of the at least two file compression packages excluding the first file compression package, and transmitting the second data blocks onto a blockchain, and
   setting a hash value of a last data block in the second data blocks as a root hash value, and transmitting the root hash value,
   wherein the obtaining files to be shared and forming at least two file compression packages comprises:
   obtaining files to be shared within a predefined time range;
   forming at least two file packages; and
   determining a number of files in the file packages according to a network bandwidth .

2. The method according to claim 1, wherein
   executing compression and encryption operations on the file packages respectively to form the file compression packages.

3. The method according to claim 1, wherein
   the first data block further comprise an initial data block identifier.

4. The method according to claim 1, wherein
   concurrently transmitting the file compression packages onto a blockchain.

5. The method according to claim 1, wherein
   the generating second data blocks for a second file compression package in the at least two file compression packages excluding the first file compression package according to a hash value of a previous data block, a file name and a corresponding hash value of the second file compression package further comprises:
   obtaining shared files comprised in the second file compression packages based on the file name of the second file compression packages,
   executing compression and encryption operations on the shared files and the hash value of the previous data block, to form an update file compression package,
   transmitting the update file compression package onto a blockchain on-chain, and obtaining a hash value corresponding to the update file compression package, and
   generating second data blocks based on the file name of the update file compression package and the hash value c corresponding to the update file compression package.

6. A file sharing method, comprising:
   receiving a root hash value, obtaining a last data block corresponding to the root hash value from a blockchain according to the root hash value, obtaining a file name of a file compression package comprised in the last data block, and obtaining files in the file compression package;
   cyclically executing the following steps until each file compression package in the blockchain indicated by the root hash value is obtained:
   setting a hash value of a previous data block comprised in the last data block as a current hash value,
   obtaining a hash value of the previous data block, the file name of the file compression package corresponding to a current data block, and the files in the file compression package from the blockchain according to the current hash value; and
   setting the hash value of the obtained previous data block as the current hash value,
   wherein at least two file compression packages of the blockchain comprises files to be shared within a predefined time range, and
   wherein a number of files in the file packages is determined according to a network bandwidth.

7. The method according to claim 6, wherein
   when the current data block contains an initial data block identifier, indicating that the obtaining of each file compression package in the blockchain indicated by the root hash value is completed.

8. The method according to claim 6, wherein
   the obtaining the files in the file compression package comprises:
   executing decompression and decryption operations on the file compression package to obtain the files in the file compression package.

9. The method according to claim 6, wherein
   when the file compression package contains the hash value of the previous data block, executing decompression and decryption operation on the file compression package to obtain the hash value of the previous data block.

10. An electronic apparatus, comprising:
    one or more processors;
    storage means for storing one or more programs when executed by the one or more processors to cause the one or more processors to implement a file sharing method, comprising:

obtaining files to be shared and forming at least two file compression packages;

transmitting the file compression packages onto a blockchain, and obtaining hash values corresponding to the file compression packages;

generating a first data block based on a file name and a hash value of a first file compression package in the at least two file compression packages, and transmitting the first data block onto a blockchain;

generating second data blocks based on a hash value of a previous data block, a file name and a hash value a corresponding to second file compression package wherein the second file compression packages are one of the at least two file compression packages excluding the first file compression package, and transmitting the second data blocks onto a blockchain, and setting a hash value of a last data block in the second data blocks as a root hash value, and transmitting the root hash value, wherein the obtaining files to be shared and forming at least two file compression packages comprises:

obtaining files to be shared within a predefined time range;

forming at least two file packages; and determining a number of files in the file packages according to a network bandwidth .

11. The electronic apparatus according to claim 10, wherein concurrently transmitting the file compression packages onto a blockchain.

12. The electronic apparatus according to claim 10, wherein the generating second data blocks for a second file compression package in the at least two file compression packages excluding the first file compression package according to a hash value of a previous data block, a file name and a corresponding hash value of the second file compression package further comprises:

obtaining shared files comprised in the second file compression packages based on the file name of the second file compression packages, executing compression and encryption operations on the shared files and the hash value of the previous data block, to form an update file compression package, transmitting the update file compression package onto a blockchain on-chain, obtaining a hash value corresponding to the update file compression package, and generating second data blocks based on the file name of the update file compression package and the hash value corresponding to the update file compression package.

13. A non-transitory computer-readable medium, on which a computer program is stored, being characterized in when the program is executed by a processor, the program causes a file sharing method to be implemented, which comprising:

obtaining files to be shared and forming at least two file compression packages;

transmitting the file compression packages onto a blockchain, and obtaining hash values corresponding to the file compression packages;

generating a first data block based on a file name and a hash value of a first file compression package in the at least two file compression packages, and transmitting the first data block onto a blockchain;

generating second data blocks based on a hash value of a previous data block, a file name and a hash value a corresponding to second file compression package wherein the second file compression packages are one of the at least two file compression packages excluding the first file compression package, and transmitting the second data blocks onto a blockchain, and setting a hash value of a last data block in the second data blocks as a root hash value, and transmitting the root hash value, wherein the obtaining files to be shared and forming at least two file compression packages comprises:

obtaining files to be shared within a predefined time range, forming at least two file packages, and determining a number of files in the file packages according to a network bandwidth .

14. The non-transitory computer-readable medium according to claim 13, wherein concurrently transmitting the file compression packages onto a blockchain.

15. The non-transitory computer-readable medium according to claim 13, wherein the generating second data blocks for a second file compression package in the at least two file compression packages excluding the first file compression package according to a hash value of a previous data block, a file name and a corresponding hash value of the second file compression package further comprises:

obtaining shared files comprised in the second file compression packages based on the file name of the second file compression packages, executing compression and encryption operations on the shared files and the hash value of the previous data block, to form an update file compression package, transmitting the update file compression package onto a blockchain on-chain, obtaining a hash value corresponding to the update file compression package, and generating second data blocks based on the file name of the update file compression package and the hash value corresponding to the update file compression package.

16. An electronic apparatus, comprising:

one or more processors;

storage means for storing one or more programs when executed by the one or more processors to cause the one or more processors to implement a file sharing method, comprising:

receiving a root hash value, obtaining a last data block corresponding to the root has value from a blockchain according to the root hash value, obtaining a file name of a file compression package comprised in the last data block, and obtaining files in the file compression package;

cyclically executing the following steps until each file compression package in the blockchain indicated by the root hash value is obtained;

setting a hash value of a previous data block comprised in the last data block as a current has value, obtaining a hash value of the previous data block, the file name of the file compression package corresponding to a current data block, and the files in the file compression package from the blockchain according to the current hash value; and setting the hash value of the obtained previous data block as the current has value, wherein at least two file compression packages of the blockchain comprises files to be shared within a predefined time range, and wherein a number of files in the file packages is determined according to a network bandwidth.

17. The electronic apparatus according to claim 16 wherein when the current data block contains an initial data block identifier, indicating that the obtaining of each file compression package in the blockchain indicated by the root hash value is completed.

18. A non-transitory computer-readable medium, on which a computer program is stored, being characterized in when the program is executed by a processor, the program causes a file sharing method to be implemented, which comprising:
- receiving a root hash value, obtaining a last data block corresponding to the root hash value from a blockchain according to the root hash value, obtaining a file name of a file compression package comprised in the last data block, and obtaining files in the file compression package;
- cyclically executing the following steps until each file compression package in the file blockchain indicated by the root hash value is obtained;
- setting a hash value of a previous data block comprised in the last data block as a current hash value;
- obtaining a hash value of the previous data block, the file name of the file compression package corresponding to a current data block, and the files in the file compression package from the blockchain according to the current hash value; and
- setting the hash value of the obtained previous data block as the current hash value,
- wherein at least two file compression packages of the blockchain comprises files to be shared within a predefined time range, and
- wherein a number of files in the file packages is determined according to a network bandwidth.

19. The non-transitory computer-readable medium according to claim 18, wherein when the current data block contains an initial data block identifier, indicating that the obtaining of each file compression package in the blockchain indicated by the root hash value is completed.

* * * * *